No. 676,706. Patented June 18, 1901.
J. TRANTOM.
WEIGHING APPLIANCE.
(Application filed Oct. 25, 1900.)

(No Model.)

Witnesses

Joseph Trantom
Inventor
By Edward P. Thompson, Ass. Atty

UNITED STATES PATENT OFFICE.

JOSEPH TRANTOM, OF LIVERPOOL, ENGLAND.

WEIGHING APPLIANCE.

SPECIFICATION forming part of Letters Patent No. 676,706, dated June 18, 1901.

Application filed October 25, 1900. Serial No. 34,381. (No model.)

*To all whom it may concern:*

Be it known that I, JOSEPH TRANTOM, a subject of the Queen of Great Britain, residing in Liverpool, in the county of Lancaster, England, have invented certain new and useful Improvements in Weighing Appliances, (for which application has been made in England for provisional protection under No. 7,927, dated April 28, 1900,) of which the following is a specification.

This invention relates to weighing appliances for shop and other use, and has for its object an arrangement whereby an ordinary counter or other like scale with a single scale-beam can be converted into a scale with two beams on the one standard, said beams being so arranged that they can be each individually used without interfering with the free action or simultaneous use of the other.

Figure 1:
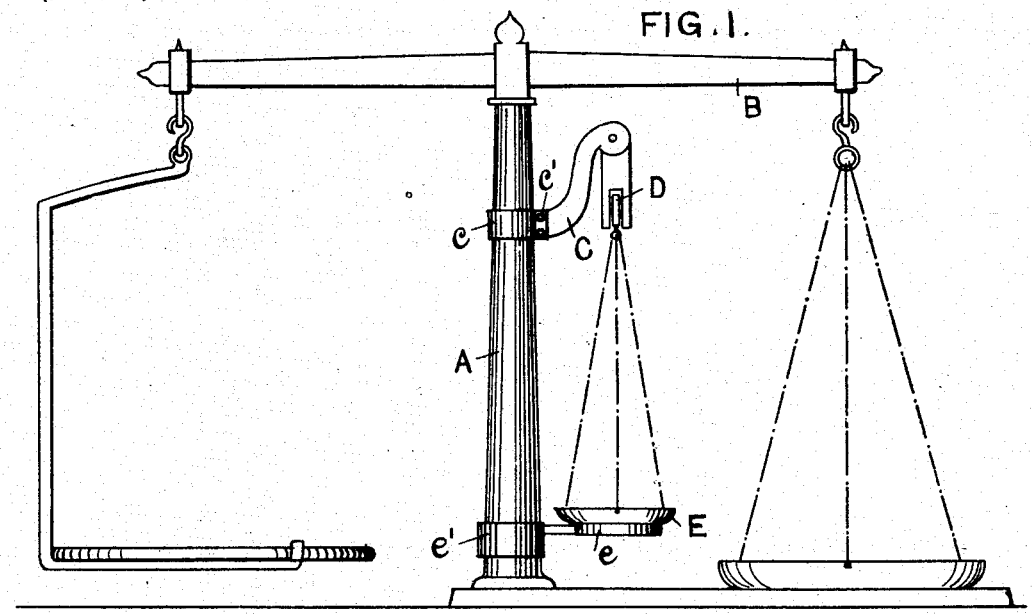
Figure 2:
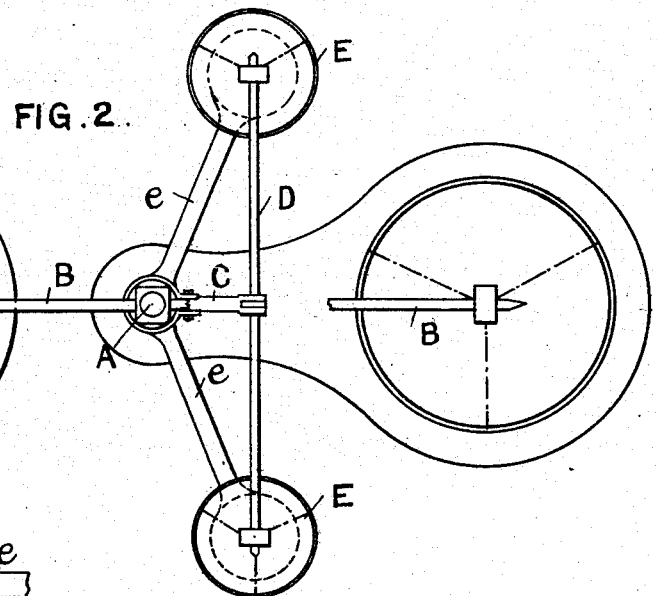
Figure 3:
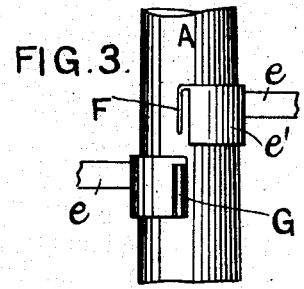

In the accompanying drawings, Figure 1 is a front elevation of counter-scales with my invention applied thereto; Fig. 2, a plan thereof; Fig. 3, a detail view.

I take an ordinary scale that has a standard or upright A with scale-beam B at top thereof, and to this standard lower down I clip a bracket C, from which is suspended an auxiliary scale-beam D, preferably of shorter length and adapted to weigh smaller quantities than the longer beam. This beam D has scale-trays provided complete. The bracket is clipped to the upright by means of a band c, that is passed around the upright A and grasps it, so as to hold the bracket, with its scale-beam D, in such a position that it is clear of the other beam B, and each can be worked separately. One end of the bracket abuts against the standard A, while from the other end is suspended the scale-beam D, and the band can be tightened around the standard by screwing up a nut or nuts $c'$.

E represents a pair of tables supported on arms $e$ from the standard A, these tables forming bases elevated above the counter for one or other of the trays of the scale to rest on during the weighing operation. The arms may be secured to the uprights in any suitable manner. One arrangement is shown in Fig. 3, in which a strap $e'$ is made in halves, with one arm E attached to one half and the other arm attached to the other half, the two halves being joined together by passing the pin F on one into socket G on the other.

By this invention any person can provide an ordinary shop-scale with an auxiliary scale for weighing purposes. This enables me to provide two scales on one standard, thus economizing space, and besides the larger scale may be used for weighing heavy articles and the smaller for light articles, so that by thus having two classes of scale greater accuracy in weighing is secured. The shopman can weigh with great accuracy, because he can weigh small quantities on the smaller scale with greater accuracy than is the case with a larger one.

I claim as my invention—

1. The combination of an upright, a scale-beam at the top thereof, a bracket clipped to said upright below said beam and carrying an auxiliary scale-beam having scale-trays, and a pair of tables supported on arms which are secured to said upright under said trays and above the counter upon which the whole apparatus rests.

2. In weighing appliances in which a plurality of weigh-beams are suspended from one standard, the combination of a bracket adapted to support a weigh-beam and balance-scales, a clip adapted to fix said bracket to said standard, tables beneath the trays of said additional balance-scales, and means for supporting said tables from the standard, substantially as set forth.

3. In weighing appliances in which a plurality of weigh-beams are suspended from one standard, the combination of tables standing beneath the scale-pans, arms connected to said tables, clips on the end of said arms, one of each pair of clips being provided with a pin, and the other with a slot adapted to be engaged with one another and to rigidly connect said arms to the standard, substantially as set forth.

In witness whereof I have hereunto signed my name, this 17th day of October, 1900, in the presence of two subscribing witnesses.

JOSEPH TRANTOM.

Witnesses:
G. C. DYMOND,
JOHN MCLACHLAN.